(12) United States Patent
Nurnberg et al.

(10) Patent No.: US 7,950,514 B1
(45) Date of Patent: May 31, 2011

(54) APPARATUS AND METHOD FOR VARIABLE TORQUE BRAKING OF ESCALATORS AND MOVING WALKWAYS

(75) Inventors: Thomas Nurnberg, Port Byron, IL (US); Anthony Boom, Moline, IL (US)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 12/613,940

(22) Filed: Nov. 6, 2009

(51) Int. Cl.
*B66B 25/00* (2006.01)
(52) U.S. Cl. ......................... 198/323; 198/322
(58) Field of Classification Search ............... 198/322, 198/323; 188/75, 166, 171
See application file for complete search history.

(56) References Cited

U.S. PATENT DOCUMENTS

| | | | |
|---|---|---|---|
| 1,743,995 A | 1/1930 | Bartlett | |
| 2,085,873 A | 7/1937 | Schoepf et al. | |
| 2,824,623 A | 2/1958 | Nord et al. | |
| 3,830,344 A * | 8/1974 | Cervenec et al. | 188/171 |
| 3,896,925 A * | 7/1975 | Mitsui et al. | 198/323 |
| 4,023,655 A * | 5/1977 | Anzai et al. | 188/171 |
| 4,031,987 A * | 6/1977 | Webb | 188/75 |
| 4,033,434 A * | 7/1977 | Henrich | 188/75 |
| 4,588,065 A * | 5/1986 | Maiden et al. | 198/323 |
| 4,875,558 A * | 10/1989 | Berkhan et al. | 188/171 |
| 5,337,878 A * | 8/1994 | Mehlert et al. | 198/323 |
| 6,112,166 A | 8/2000 | Joosten | |
| 6,520,300 B2 | 2/2003 | Balzer-Apke et al. | |
| 6,766,893 B2 | 7/2004 | Neumann et al. | |
| 6,805,224 B2 | 10/2004 | Lauch et al. | |
| 6,896,119 B2 * | 5/2005 | Wiesinger et al. | 198/323 |
| 6,971,496 B1 | 12/2005 | Nurnberg et al. | |
| 2002/0109404 A1 | 8/2002 | Balzer-Apke et al. | |
| 2003/0102199 A1 | 6/2003 | Neumann et al. | |

OTHER PUBLICATIONS

International Search Report for PCT/US2010/051075 dated Dec. 1, 2010.
Written Opinion of ISA for PCT/US2010/051075 dated Dec. 1, 2010.

* cited by examiner

*Primary Examiner* — James R Bidwell
(74) *Attorney, Agent, or Firm* — Venable LLP; Robert Kinberg; Ryan M. Flandro

(57) ABSTRACT

A braking apparatus and method for an escalator or moving walkway are provided. The braking apparatus may include a braking element, a linearly controllable solenoid assembly, a biasing mechanism, and a control device. The braking element may be adapted to engage a brake drum or brake disk on a drive shaft of the escalator or moving walkway. The linearly controllable solenoid assembly may include a brake coil and an elongated member. The elongated member may be moveable linearly along an axis and the braking element may be coupled to the elongated member. The biasing mechanism may be arranged to bias the elongated member in a first direction along the axis to increase a torque applied to the drive shaft by the braking element. The control device may be configured to modulate a current to the brake coil based on at least one measured parameter associated with an operating condition of the escalator or moving walkway, whereby the elongated member is biased in a second direction along the axis opposite the first direction to decrease the torque applied to the drive shaft by the braking element.

34 Claims, 3 Drawing Sheets

APPARATUS AND METHOD FOR VARIABLE TORQUE BRAKING OF ESCALATORS AND MOVING WALKWAYS

BACKGROUND

1. Field of Invention

The present invention relates generally to controlled braking mechanisms, and more particularly, to a variable torque braking apparatus and method for use in conjunction with escalators, moving walkways, and the like.

2. Related Art

Current braking systems for escalators and moving walkways (also known as, e.g., power walks or travelators) include, for example, open control loop braking systems with guided compression springs. Alternatively or in addition, closed control loop braking systems with ceramic magnetic brakes have been utilized. Each of these braking systems, however, present a variety of control issues.

For example, open control loop systems with guided compression springs are bi-stable braking devices. That is, the brake is released during starting and running and applied with a constant spring force when the escalator or power walk is stopped. Due to this bi-stable functionality, the stopping distance and stopping rates can vary widely depending on escalator loading. For example, a lightly loaded escalator will stop in less time and over a shorter distance than a fully loaded escalator.

To reduce the stopping distance differences between no load and full load conditions on the escalator, a large flywheel is often added to the motor to offset the effects of escalator loading. Even though the large flywheel can provide the inertia to prevent the escalator from stopping too quickly when the escalator is lightly loaded, this same inertia is counterproductive when the escalator is fully loaded. The large flywheel requires that the brakes provide enough torque to stop the load on the escalator as well as to stop the large flywheel. Thus, the presence of the flywheel requires the brakes to be oversized for all applications.

Moreover, notwithstanding the addition of a large flywheel, the difference in stopping distance and rate can still vary between no load and full load conditions. In many applications, this difference in stopping distances can still pose a problem if the customer requires that the stop distance range be narrower than the open loop brake system can provide. Additionally, in the United States and Canada, the ASME A17.1 Escalator Safety Code limits maximum deceleration rates as well as maximum stopping distances.

Another problem that can arise with open loop spring applied braking systems is that the available brake torque may diminish over time due to brake wear or environmental conditions. As a result, the stopping rates and distances can become non-code compliant and/or may not meet customer specifications if the brake is not readjusted or replaced regularly.

In an effort to provide consistent stopping, some manufacturers of escalators and moving walkways have added inverters (e.g., AC drives) to provide dynamic motor braking. The addition of inverters, however, can also have disadvantages. Inverters can be costly and can require extra room in the escalator truss for mounting. This can be prohibitive on some types of escalators where there is no extra room in the truss. Also, at least one of a dynamic resistor or a regeneration unit is required to dump the generated braking energy. Both items also add cost and require space for mounting.

Moreover, it is generally not practical to add closed loop control to guided compression spring braking systems because the brake coils on these types of units are bi-stable devices. Bi-stable devices are designed to be either actuated or not actuated. Consequently, controlling the brake linearly is not possible through closed loop control.

Although ceramic magnetic brakes utilizing closed control loop braking may solve many of the problems inherent in guided compression spring open control loop braking systems, they nevertheless present other issues. For example, while stopping distances and rates achieved using closed loop controlled magnetic braking systems may be much more consistent than with open loop spring applied braking systems, the magnetic brake can tend to be sluggish. Consequently, the braking system can be relatively slow to hone in on a specific braking torque required for a given escalator load. The result is that the stopping rate may either under shoot or over shoot a set point at the beginning of the stop sequence, thereby producing a "wavy" stop until the control is able to hone in on the correct torque.

Furthermore, since the magnetic null characteristics of magnetic brakes can vary from brake to brake, it is necessary to tune the closed loop brake controller for each brake before putting the brake into service. If the brake controller is not tuned, then it is possible for the brake to drag slightly over time and/or provide a stop that is not optimum. Also, the use of a magnetic brake does not allow the addition of a second brake on the same motor. As a result, magnetic brakes cannot be used for certain applications, particularly in Europe where the European escalator code (EN code) requires the use of compression guided springs as well as a second brake whenever the rise of the escalator exceeds a certain height.

SUMMARY

The invention is directed to a braking apparatus for an escalator or moving walkway as well as a method for controlling a braking profile for an escalator or moving walkway.

In an embodiment of the invention, a braking apparatus is provided. The braking apparatus may include a braking element, a linearly controllable solenoid assembly, a biasing mechanism, and a control device. The braking element may be adapted to engage a brake drum or brake disk on a drive shaft of the escalator or moving walkway. The linearly controllable solenoid assembly may include a brake coil and an elongated member. The elongated member may be moveable linearly along an axis and the braking element may be coupled to the elongated member. The biasing mechanism may be arranged to bias the elongated member in a first direction along the axis to increase a torque applied to the drive shaft by the braking element. The control device may be configured to modulate a current to the brake coil based on at least one measured parameter associated with an operating condition of the escalator or moving walkway, whereby the elongated member is biased in a second direction along the axis opposite the first direction to decrease the torque applied to the drive shaft by the braking element.

In another embodiment of the invention, a method for controlling a braking profile for an escalator or moving walkway using the braking apparatus is also provided. The method may include biasing the elongated member in a first direction along the axis with a biasing mechanism to increase a torque applied to the drive shaft by the braking element. The method may further include modulating a current to the brake coil with a control device based on at least one measured parameter associated with an operating condition of the escalator or moving walkway, whereby the elongated member is biased in a second direction along the axis opposite the first direction to decrease the torque applied to the drive shaft by the braking element.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of some example embodiments of the invention, as illustrated in the accompanying drawings. Unless otherwise indicated, the accompanying drawing figures are not to scale. Several embodiments of the invention will be described with respect to the following drawings, in which like reference numerals represent like features throughout the figures, and in which.

DETAILED DESCRIPTION

Figure 1:
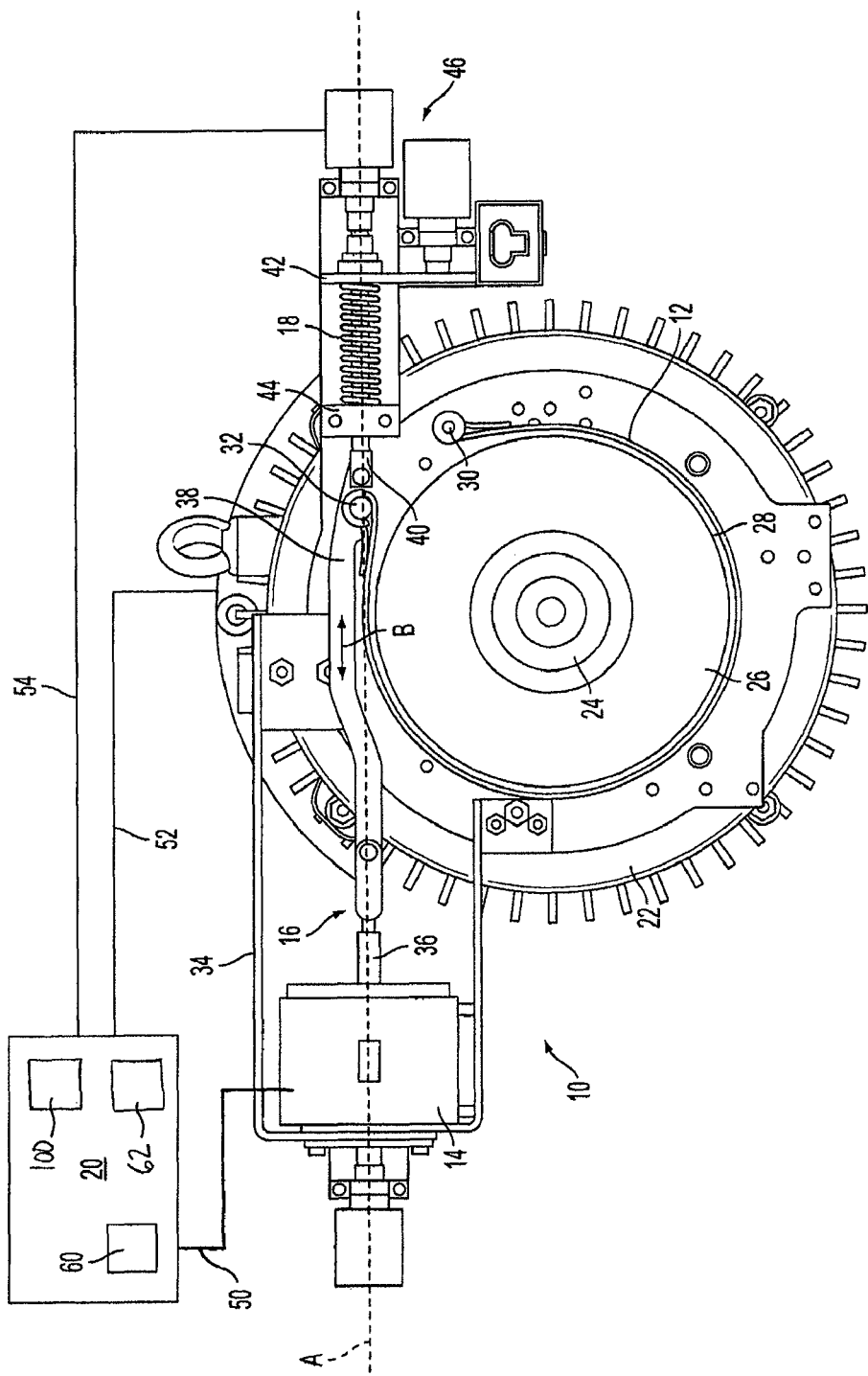
FIG. 1 is a partial schematic side view of a braking apparatus for an escalator or moving walkway according to an embodiment of the invention.

In describing the example embodiments illustrated in the drawings, specific terminology is employed for the sake of clarity. However, the invention is not intended to be limited to the specific terminology so selected. It is to be understood that each specific element includes all technical equivalents that operate in a similar manner to accomplish a similar purpose.

Figure 2:
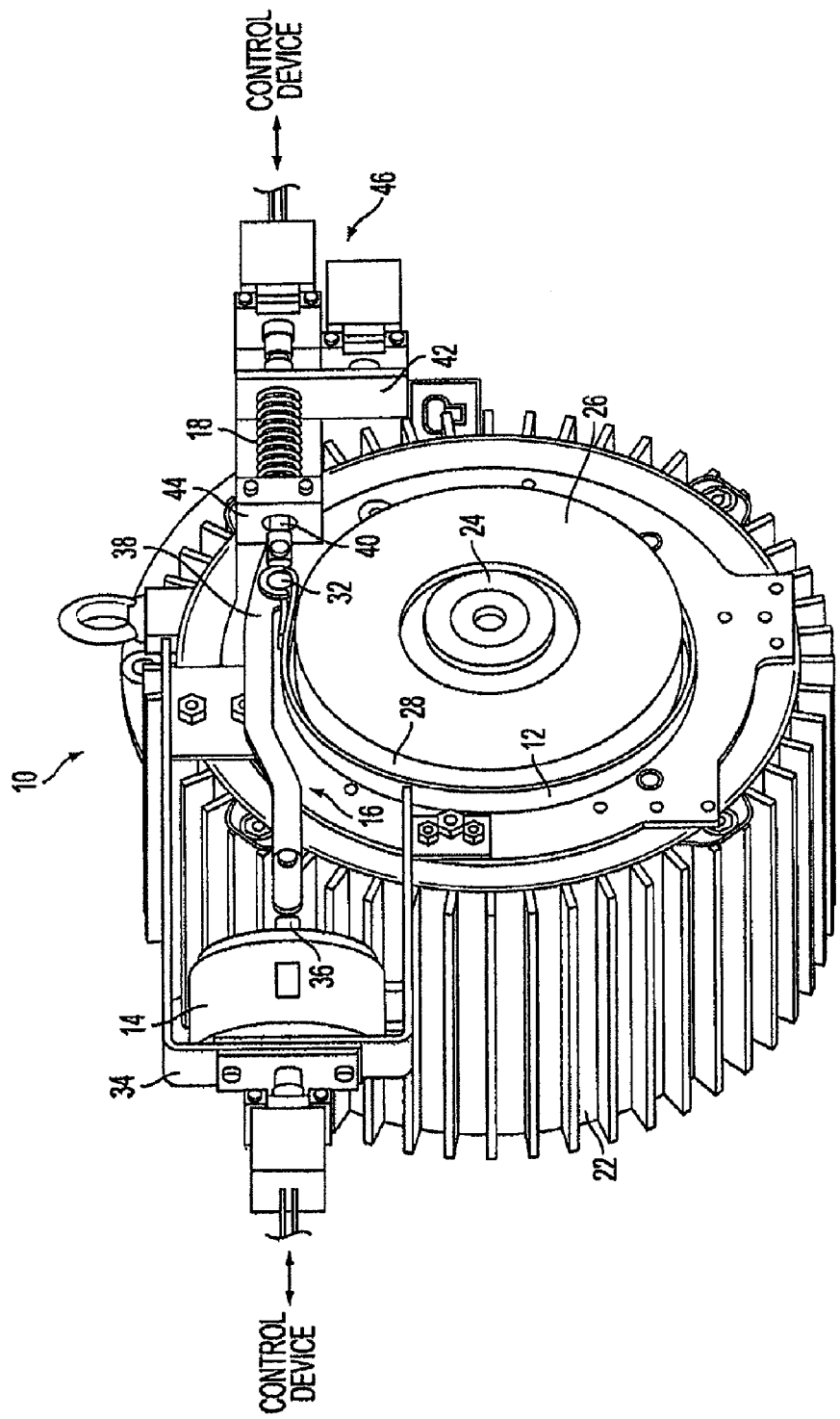
FIG. 2 is a partial perspective view of the braking apparatus of FIG. 1.

FIG. 1 is a partial schematic side view of a braking apparatus 10 for an escalator or moving walkway, according to an embodiment of the invention. The escalator or moving walkway (not shown herein in further detail) may comprise any known or conventional escalator or moving walkway as would be understood by one of ordinary skill in the art. Escalators are also referred to as moving staircases. Moving walkways are also referred to as moving sidewalks (or speedwalks), moving ramps (or speedramps), autowalks, and travelators and may include, for example, a plurality of pallets arranged one after the other to form a substantially even and/or linear track extending substantially horizontally or somewhat inclined relative to a direction of motion. FIG. 2 is a partial perspective view of the braking apparatus of FIG. 1.

The braking apparatus 10 shown in the embodiment depicted in FIGS. 1 and 2 includes a braking element 12, a controllable solenoid assembly including a brake coil 14 and an elongated member 16, a biasing mechanism 18, and an electronic control device 20. The braking apparatus 10 may be arranged and configured to stop the escalator or moving walkway at a predetermined deceleration rate and within a predetermined stop distance regardless of the load on the escalator or moving walkway when an emergency shutoff sequence or command is initiated. In this way, passengers on the escalator or moving walkway may remain safe and comfortable during deceleration. Such an emergency shutoff sequence may be initiated manually by the pressing of an emergency shutoff button or switch (not shown) or automatically via one or more sensors (not shown) arranged to monitor the operating status of the escalator or moving walkway. The braking apparatus 10 may stop the escalator or moving walkway by applying a variable torque to an output mechanism of an AC drive motor 22, in particular, a drive shaft and/or a brake drum 26 (brake disk) secured to the drive shaft 24, based on a measured load on the escalator or moving walkway.

According to the embodiment shown in FIGS. 1 and 2, the braking element 12 may be, for example, in the form of a brake band of friction material (e.g., metal, plastic, rubber, leather, cloth, fiber composite, etc.) arranged concentrically around an outer annular surface 28 of the brake drum 26. The braking element 12 may be optionally engageable with at least a portion (e.g. approximately 270 degrees) of the outer annular surface 28 of the brake drum 26 to apply a variable or adjustable torque thereto. The braking element 12 may be secured at a first end 30 to a fixed point on the escalator or moving walkway, for example, on a housing of the drive motor 22. A second end 32 of the braking element 12 may be pivotably attached to the elongated member 16 to ensure consistent clearance of the braking element 12 from the brake drum 26 when released. One or more spacing rollers may be utilized in combination with a pin to pivotably attach the second end 32 of the braking element 12 to the elongated member 16.

The brake coil 14 of the solenoid assembly may be mounted on a bracket or frame 34 which may be fixedly secured to, for example, the housing of the drive motor 22 or another stationary portion of the escalator or moving walkway. The elongated member 16 may include a metallic core 36 moveably arranged within the windings of brake coil 14 and coupled at an outer end to an intermediate portion or linkage member 38. The intermediate linkage member 38 may be arranged adjacent to the outer annular surface 28 the brake drum 26 and may include an arched or curved portion adapted to provide additional clearance for the braking element 12 when it is released from the brake drum 26. The elongated member 16 may also include another end linkage member or rod 40 coupled to the intermediate linkage member 38 and to an adjustable plate 42. The elongated member 16, including metallic core 36, intermediate linkage member 38, and end linkage member 40, could also be formed as a single integrally formed member.

The elongated member 16 is arranged to be linearly moveable bi-directionally along an axis A as indicated by double-ended arrow B shown in FIG. 1. The biasing mechanism 18, which may be, for example, a compression spring, is arranged to bias the elongated member 16 in a first direction (i.e., to the right in FIG. 1) along the axis A to increase a torque applied to the drive shaft 24 (via brake drum 26) by the braking element 12. On the other hand, when a current is supplied to the brake coil 14, the elongated member 16 is biased in a second direction (i.e., to the left in FIG. 1) along the axis A to decrease the torque applied to the drive shaft 24 (via brake drum 26) by the braking element 12. That is, as current to the brake coil 14 is increased, the torque applied to the drive shaft 24 by the braking element 12 is decreased or removed. In this way, the elongated member 16 is utilized in tension to provide a low hysteresis, pull release linkage for optimum variable torque control. The tension in the elongated member 16 maintains a straight alignment of action and movement to minimize extraneous lateral movement and friction in the linkage that can occur with compression-type release linkages. When the braking apparatus 10 is mounted on an escalator or moving walkway, the axis A may extend substantially perpendicular to the drive shaft 24 and substantially parallel to a tangent of the drive shaft 24.

As shown in the embodiment depicted in FIGS. 1 and 2, the rod 40 extends through an opening in a fixed plate 44 and is attached at a second end to the adjustable plate 42 by, for example, an adjustable threaded connection. The compression spring 18 acts to bias plate 42 and rod 40 in the first direction along the line of action defined by axis A to increase the torque applied to the drive shaft 24 (via brake drum 26) by the braking element 12. This is the default safety position of the braking apparatus 10 when no power is provided to the drive motor 22 and/or to the brake coil 14. Allowing adjustment of the rod 40 relative to the plate 42 provides the ability to adjust the length and force of the compressing spring 18 and, thus, the torque applied to the brake drum 26. One or more brake wear switch indicators 46 may also be provided proximate the rod 40 and plate 42.

The electronic control device 20 may be electrically coupled to or in electronic communication with one or more of the brake coil 14, the drive motor 22, and the brake wear switch indicators 46 via electrical and/or electronic links 50, 52, and 54, respectively. The control device 20 may include, for example, but not limited to, a printed circuit board (PC Board) that may include, for example, a proportional-integral-derivative controller (PID) such as a programmable logic controller (PLC) or a digital controller implemented with a microcontroller unit (MCU) or processor 100. The control device 20 may also be configured with software, including fuzzy logic software, for execution by the processor 100. The control device 20 may also include a current regulator device 62 such as, for example, a pulse-width modulation (PWM) device.

The control device 20 may be configured to modulate a current supplied to the brake coil 14. As noted above, when the control device 20 outputs a current to the brake coil 14, the elongated member 16 is biased linearly in the second direction (to the left in FIG. 1) along the axis A opposite the first direction to decrease or remove the torque applied to the drive shaft 24 (via brake drum 26) by the braking element 12. The amount of current supplied to the brake coil 14 may be varied or adjusted based on the output value of the PWM device 62 and/or the status of one or more of the drive motor 22 and the brake wear switch indicators 46 received by the control device 20 via electrical and/or electronic links 52 and 54. As a result, the torque applied to the drive shaft 24 can be adjusted to control a braking profile of the escalator or moving walkway.

During operation of the escalator or moving walkway, the control device 20 may provide a current to the brake coil 14 sufficient to ensure that the braking element 12 is open, that is, to ensure the braking element 12 does not contact or apply any torque to brake drum 26. The control device 20 may, for example, output a minimum brake coil current necessary to keep the brake open while conserving energy. Upon initiation of a stop sequence, for example, by manually pressing an emergency stop button or automatic sensing of an run operation error, the control device 20 can execute a stop algorithm to modulate the brake coil current as needed in a closed loop control to apply a variable torque to the motor output drive shaft 24 to stop the escalator or moving walkway at a predetermined deceleration rate and within a predetermined stop distance regardless of the load on the escalator or moving walkway.

After receiving a stop command, the control device 20 may first estimate a load on the escalator or moving walkway by measuring an instantaneous speed of the AC drive motor 22, to which power has been cut. For example, upon initiation of the stop sequence, the control device 20 may request/receive (via link 52) RPM data of the motor 22 with respect to a motor droop characteristic at a specified time after the stop command and, based on the RPM data, calculate the estimated load on the escalator or moving walkway. Such calculation may involve utilizing a RPM-load look-up or correlation table. The control device 20 may then initially adjust (i.e., reduce) the brake coil current to an estimated level sufficient to stop the escalator or moving walkway at a stored programmable deceleration rate based on the estimated load. By doing so, the initial brake torque output command from the control device 20 may be very close to an actual brake torque required to stop the given load at the predetermined deceleration rate. An advantage of having the initial brake torque being very close to the actual required brake torque is that time is thereafter minimized for the control device 20 to find the precise torque required to stop a given load at the predetermined deceleration rate. As a result, under-shooting and/or over-shooting the desired deceleration rate is minimized and a more stable consistent stop is thereby provided.

The control device 20 may also, upon receiving the stop command, estimate a temperature of the brake coil 14. As the brake coil 14 warms up or cools down, the resistance in the brake coil 14 varies proportionately. If temperature variations in the brake coil 14 are not compensated for, a given PWM output could result in a different brake coil current providing different brake torque values at different times and thereby prevent the braking apparatus 10 from providing a consistent deceleration over the normal operating temperature range of the brake coil. The control device 20 may, for example, compensate for brake coil temperature by monitoring how much the PWM device duty cycle changes during normal operation. When a stop command is given, the actual PWM output value may be subtracted from some known PWM output value for a given brake coil current. The difference is called the offset. The offset can be positive or negative and may be added to the estimated PWM output value for loading. In this way, the control device 20 may be able to compensate for temperature-related resistance variations in the brake coil 14 and thereby provide a consistent deceleration rate over the normal operating temperature range of the brake coil 14.

The control device 20 may also include closed loop fuzzy logic software configured to continuously or intermittently adjust and/or modulate the brake coil current (and therefore the applied torque) during the stop sequence to precisely control the braking deceleration rate of the escalator or moving walkway. The control device 20 may continuously or intermittently measure the deceleration rate of the escalator or moving walkway via link 52 and compare the measured value to the predetermined stored programmable deceleration rate. When the measured deceleration rate of the escalator or moving walkway is less than the stored programmable deceleration rate (indicating a heavy load), the control device 20 may decrease the brake coil current, thus increasing the torque applied by the braking element 12 to the drive shaft 24. On the other hand, when the measured deceleration rate of the escalator or moving walkway is greater than the stored programmable deceleration rate (indicating a light load), the control device 20 may increase the brake coil current, thus decreasing the torque applied by the braking element 12 to the drive shaft 24. The control device 20 may continue to modulate the brake coil current accordingly until the escalator or moving walkway comes to a complete stop.

The fuzzy logic software of the control device 20 may include a symmetrical diminishing algorithm with clipping logic executable by the processor to precisely control the deceleration rate (braking profile) of the escalator or moving walkway during the stop sequence and to prevent the control device 20, in particular the current regulator or PWM device 62, from outputting a brake current (corresponding to the PWM current output value) greater than or equal to a stored programmable maximum allowable value or less than or equal to zero. The fuzzy logic software may include instructions to monitor the actual PWM current output value and compare this output value to the stored programmable maximum allowable value. The control device 20 can then output an adjusted output value corresponding to a particular brake torque to be generated.

When the measured deceleration rate is greater than the stored programmable deceleration rate (set point) and the current regulator's actual output value (e.g., a PWM value) is less than or equal to half of the maximum allowable value, the control device 20 may increase the output value by an amount that is the product of the actual output value and a predetermined percentage greater than one hundred percent. For example, if the measured deceleration rate is greater than 175% of the stored programmable deceleration rate and the actual output value is less than or equal to 50% of the maximum allowable value, then the actual output value may be increased by 130%. If the measured deceleration rate is greater than 150% (but less than or equal to 175%) of the stored programmable deceleration rate and the actual output value is less than or equal to 50% of the maximum allowable value, then the actual output value may be increased by 118%. If the measured deceleration rate is greater than 125% (but less than or equal to 150%) of the stored programmable deceleration rate and the actual output value is less than or equal to 50% of the maximum allowable value, then the actual output value may be increased by 106%. If the measured deceleration rate is greater than 110% (but less than or equal to 125%) of the stored programmable deceleration rate and the actual output value is less than or equal to 50% of the maximum allowable value, then the actual output value may be increased by 103%.

When the measured deceleration rate is greater than the stored programmable deceleration rate (set point) and the actual output value is greater than half of the maximum allowable value, the control device 20 may increase the output value by a predetermined percentage of the difference between the maximum allowable value and the actual output value. For example, if the measured deceleration rate is greater than 175% of the stored programmable deceleration rate and the actual output value is greater than 50% of the maximum allowable value, then the output value may be increased by adding 30% of the difference between the maximum allowable value and the actual output value. If the measured deceleration rate is greater than 150% (but less than or equal to 175%) of the stored programmable deceleration rate and the actual output value is greater than 50% of the maximum allowable value, then the output value may be increased by adding 18% of the difference between the maximum allowable value and the actual output value. If the measured deceleration rate is greater than 125% (but less than or equal to 150%) of the stored programmable deceleration rate and the actual output value is greater than 50% of the maximum allowable value, then the output value may be increased by adding 6% of the difference between the maximum allowable value and the actual output value. If the measured deceleration rate is greater than 110% (but less than or equal to 125%) of the stored programmable deceleration rate and the actual output value is greater than 50% of the maximum allowable value, then the brake output value may be increased by adding 3% of the difference between the maximum allowable value and the actual output value.

Thus, if the actual output value is less than ½ of the maximum allowable output, then the change in the current regulator's output value is the product of some predetermined percent and the actual output value. Whereas, if the actual output value is greater than ½ of the maximum allowable output then the change in output value is the sum of the actual output value and a percent of the difference between the actual output value and the maximum allowable output. So, the farther away from the maximum output the greater the output value can be increased. Also, the closer the actual output value is to the maximum allowable output, then the smaller the output value can be increased. In this way, the actual output value can never increase to be equal to or greater than the maximum allowable output.

In contrast, when the measured deceleration rate is less than the stored programmable deceleration rate (set point) and the actual output value is greater than half of the maximum allowable value, the control device 20 may decrease the output value by a predetermined percentage of the difference between the maximum allowable value and the actual output value. When the measured deceleration rate is less than the stored programmable deceleration rate and the actual output value is less than or equal to half of the maximum allowable value, the control device 20 may decrease the output value by an amount that is the product of the actual output value and a predetermined percentage less than one hundred percent. Thus, the logic for decreasing the brake coil current is similar to that for increasing the current. The farther away from a zero output, the greater the actual output value can be decreased. Also, the closer the actual output value is to a zero output, then the smaller the output value can be decreased. In this way, the actual output value can never decrease to be equal to or less than a zero output.

As the control device 20 recalculates the current regulator's output value, it limits the actual output value to the stored maximum or minimum PWM output value. That is, if the calculated PWM output value exceeds the maximum possible PWM output value, then the control device 20 sets the PWM output value to the maximum PWM output value. Likewise, if the control device 20 calculates a PWM output value of less than the minimum output value, then the control device 20 sets the PWM output value to the minimum allowed PWM output value.

A result of the execution of the fuzzy logic software by the control device 20 is that the deceleration rate may remain more or less constant regardless of the load on the escalator or power walk. This can allow longer periods of time between required brake adjustments since only the torque required to stop a given load is applied and can eliminate the need to precisely mathematically model the entire mechanical system of an escalator or moving walkway in order to determine the appropriate brake torque for a given load. Furthermore, the symmetrical diminishing algorithm and clipping logic may provide a more stable, responsive control without delay time introduced into the system due to what is known as Integral Wind Up.

Figure 3:
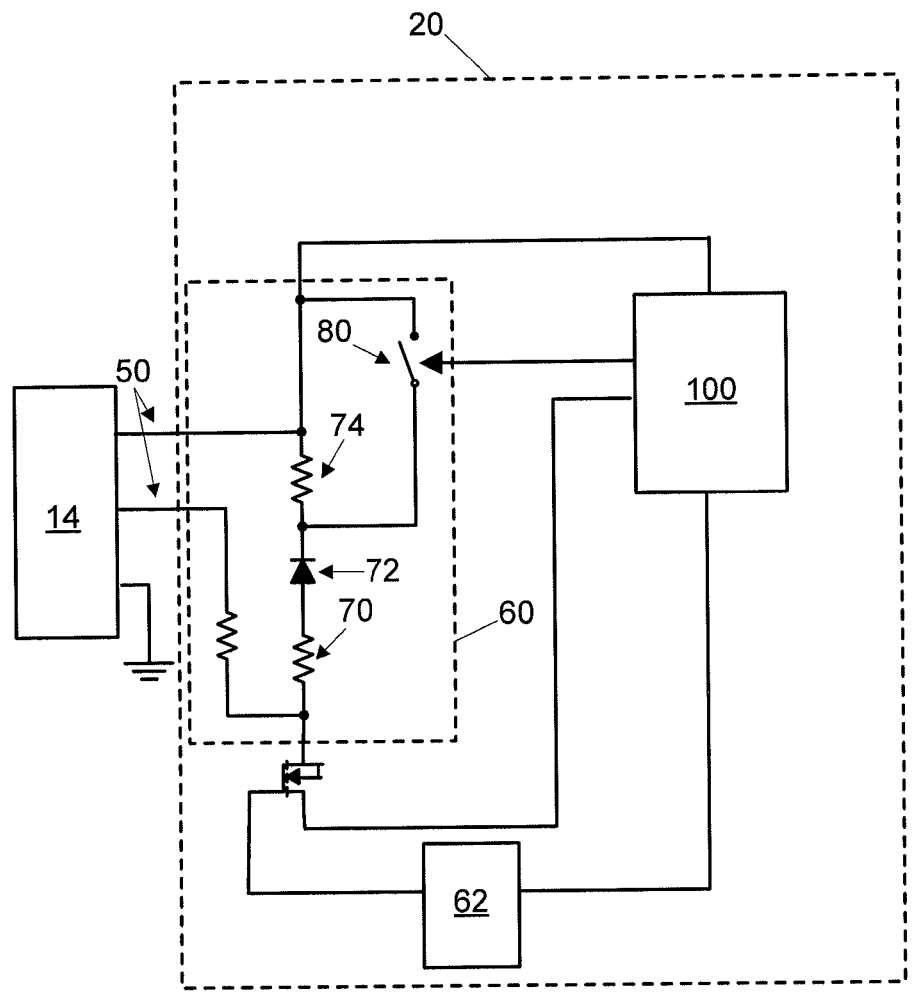
FIG. 3 depicts a partial schematic illustration of a control device of the braking apparatus of FIG. 1, including an exemplary freewheeling diode flyback circuit according to an embodiment of the invention.

The control device 20 may also include a freewheeling diode flyback circuit 60 coupled to the brake coil 14. Freewheeling diode flyback circuits are known in the art and are commonly used to avoid damage to circuitry due to flyback effects of inductive loads. FIG. 3 depicts a schematic illustration of a freewheeling diode flyback circuit 60 of the control device 20 and coupled to the brake coil 14 and including a permanent flyback resistor 70 on the anode side of a high speed flyback diode 72. The microcontroller unit or processor 100 of the control device 20 may be configured to temporarily insert an additional flyback resistor 74 in the freewheeling diode flyback circuit 60 to reduce the brake set time. Inserting the additional resistance 74, which is shorted out by a switch 80 during operation of the escalator or moving walkway, can reduce the inductance-to-resistance (L/R) time constant of the brake coil 14. Reducing the set time of the brake can reduce coasting time and distance during the time it takes for the brake to set. That is, reducing the set time of the brake can reduce the amplitude of any velocity increase during the time it takes for the brake to set when the escalator is heavily loaded and can provide for more consistent stop profiles over the entire loading range of the escalator or moving walkway.

The additional flyback resistance 74 must be removed after a short duration of time since it may be of sufficient size to prevent the brake coil 14 from being controlled by the PWM device 62 of the control device 20. Only the normal flyback resistor 70 must remain in the circuit for control of the brake.

The control device 20 may also, for example, reduce the brake coil current to a specified minimum level during a run mode of the escalator or moving walkway to conserve energy. The brake coil current can be reduced after the brake opens since it takes less current to hold the brake open than it does to open the brake. The control device 20 may, for example, modulate or reduce the brake coil current during a run mode of the escalator or moving walkway to an optimum minimum value based on measured temperature changes in the brake coil 14. For example, as the brake coil 14 warms up or cools down, the resistance in the brake coil 14 may vary proportionately causing a given brake coil current output of the control device 20 to provide a different relative position of the elongated member 16 of the braking apparatus 10. If the brake coil current drops too low, the brake may set during normal run operation. On the other hand, if brake coil current is too high, the brake coil 14 could overheat. Thus, controlling the brake coil open current while compensating for brake coil temperature allows the control device 20 to hold the brake coil current steady at an optimum value over the entire operating temperature range of the brake coil 14. Reducing the brake coil current while in the run mode may help reduce energy consumption, reduce brake coil running temperature, reduces escalator controller power supply requirements, and/or reduces heat dissipation in the control device 20.

The control device 20 may be optionally configured to operate the braking element 12 in a fixed torque mode or a variable torque mode. Furthermore, the braking apparatus 10 may be a modular unit configured such that multiple braking apparatuses 10 may be coupled to one or more control devices 20 and stacked on a single brake drive shaft 24. Such a modular braking apparatus 10 may be installed with new escalators or moving walkways and may also allow retrofitting of existing escalators or moving walkways.

In general, the braking apparatus 10 may provide a consistent stopping distance and stopping rate for an escalator or moving walkway for all escalator loading conditions. No flywheel is required since the closed loop control device 20 compensates for escalator loading. Moreover, no inverter, braking resistor, or regeneration unit is required. Also, no adjustment of the brake control device is required at installation.

While various exemplary embodiments of the present invention have been described above, it should be understood that they have been presented by way of example only, and not limitation. Thus, the breadth and scope of the invention should not be limited by the above-described embodiments, but should instead be defined only in accordance with the following claims and their equivalents.

What is claimed is:

1. A braking apparatus for an escalator or moving walkway, comprising:
   a braking element adapted to engage a brake drum or brake disk on a drive shaft of the escalator or moving walkway;
   a linearly controllable solenoid assembly including a brake coil and an elongated member, wherein the elongated member is moveable linearly along an axis, and wherein the braking element is coupled to the elongated member;
   a biasing mechanism arranged to bias the elongated member in a first direction along the axis to increase a torque applied to the drive shaft by the braking element; and
   a control device configured to modulate a current to the brake coil based on at least one measured parameter associated with an operating condition of the escalator or moving walkway, whereby the elongated member is biased in a second direction along the axis opposite the first direction to decrease the torque applied to the drive shaft by the braking element.

2. The braking apparatus of claim 1, wherein the braking element comprises a brake band adapted to extend around the brake drum or brake disk on the drive shaft, and wherein a first end of the brake band is adapted to be coupled to a fixed element of the escalator or moving walkway.

3. The braking apparatus of claim 2, wherein a second end of the brake band is adapted to be pivotably coupled to the elongated member.

4. The braking apparatus of claim 2, wherein the brake band is adapted to wrap approximately 270 degrees around the brake drum or brake disk.

5. The braking apparatus of claim 1, wherein the axis is adapted to extend substantially parallel to a tangent of the drive shaft.

6. The braking apparatus of claim 1, wherein the elongated member comprises:
   a metal core arranged within the brake coil;
   a linkage member coupled at a first end to the metal core; and
   a rod coupled to a second end of the linkage member and to the biasing mechanism.

7. The braking apparatus of claim 1, wherein the biasing mechanism comprises a compression spring.

8. The braking apparatus of claim 1, wherein the elongated member defines an intermediate portion adapted to be arranged adjacent to an outer annular surface of the brake drum or brake disk, the intermediate portion including an arch adapted to provide additional clearance for the braking element when released from the brake drum or brake disk.

9. The braking apparatus of claim 1, wherein the control device comprises a processor, a current regulator device, and software which, when executed by the processor, causes the control device to control a braking profile of the escalator or moving walkway upon receiving a stop command, the software comprising code segments executable by the processor for:
   estimating a load on the escalator or moving walkway by measuring a speed of the escalator or moving walkway; and
   outputting an initial brake coil current corresponding to a brake torque required to stop the escalator or moving walkway having the estimated load at a stored programmable deceleration rate.

10. The braking apparatus of claim 9, wherein the software further comprises code segments executable by the processor for:

estimating a temperature of the brake coil before outputting the initial brake coil current, whereby the initial brake coil current output compensates for resistance variations in the brake coil.

11. The braking apparatus of claim 9, wherein the software further comprises fuzzy logic software having code segments executable by the processor for:
decreasing the brake coil current when a measured deceleration rate of the escalator or moving walkway is less than the stored programmable deceleration rate, whereby the torque applied by the braking element to the drive shaft is increased; and
increasing the brake coil current when a measured deceleration rate of the escalator or moving walkway is greater than the stored programmable deceleration rate, whereby the torque applied by the braking element to the drive shaft is decreased.

12. The braking apparatus of claim 11, wherein the fuzzy logic software comprises a symmetrical diminishing algorithm executable by the processor to prevent the current regulator of the control device from outputting a brake coil current greater than or equal to a stored programmable maximum allowable value or less than or equal to zero.

13. The braking apparatus of claim 11, wherein fuzzy logic software further comprises code segments executable by the processor for:
measuring the deceleration rate of the escalator or moving walkway;
comparing the measured deceleration rate to the stored programmable deceleration rate; and
comparing the brake coil current output to the maximum allowable value.

14. The braking apparatus of claim 13, wherein when the measured deceleration rate is greater than the stored programmable deceleration rate and the brake coil current output is less than or equal to half of the maximum allowable value, the control device increases the brake coil current output by an amount that is the product of the brake coil current output and a predetermined percentage greater than one hundred percent.

15. The braking apparatus of claim 13, wherein when the measured deceleration rate is greater than the stored programmable deceleration rate and the brake coil current output is greater than half of the maximum allowable value, the control device increases the brake coil current output by a predetermined percentage of the difference between the maximum allowable value and the brake coil current output.

16. The braking apparatus of claim 13, wherein when the measured deceleration rate is less than the stored programmable deceleration rate and the brake coil current output is greater than half of the maximum allowable value, the control device decreases the brake coil current output by a predetermined percentage of the difference between the maximum allowable value and the brake coil current output.

17. The braking apparatus of claim 13, wherein when the measured deceleration rate is less than the stored programmable deceleration rate and the brake coil current output is less than or equal to half of the maximum allowable value, the control device decreases the brake coil current output by an amount that is the product of the brake coil current output and a predetermined percentage less than one hundred percent.

18. The braking apparatus of claim 9, wherein the control device further comprises a freewheeling diode flyback circuit coupled to the brake coil, and wherein the software further comprises code segments executable by the processor for:
temporarily inserting an additional resistance in the freewheeling diode flyback circuit.

19. The braking apparatus of claim 1, wherein the control device comprises a processor, a current regulator, and software which, when executed by the processor, causes the control device to control a braking profile of the escalator or moving walkway, the software comprising code segments executable by the processor for:
modulating the brake coil current during a run mode of the escalator or moving walkway to compensate for temperature changes in the brake coil.

20. The braking apparatus of claim 19, wherein the software further comprises code segments executable by the processor for:
reducing the brake coil current to a predetermined optimum value during a run mode of the escalator or moving walkway.

21. The braking apparatus of claim 1, wherein the control device is optionally configured to operate the braking element in a fixed torque mode or a variable torque mode.

22. A method for controlling a braking profile for an escalator or moving walkway using a braking apparatus comprising a braking element arranged to engage a brake drum or brake disk on a drive shaft of the escalator or moving walkway, and a linearly controllable solenoid assembly including a brake coil and an elongated member, wherein the elongated member is moveable linearly along an axis, and wherein the braking element is coupled to the elongated member, the method comprising:
biasing the elongated member in a first direction along the axis with a biasing mechanism to increase a torque applied to the drive shaft by the braking element; and
modulating a current to the brake coil with a control device based on at least one measured parameter associated with an operating condition of the escalator or moving walkway, whereby the elongated member is biased in a second direction along the axis opposite the first direction to decrease the torque applied to the drive shaft by the braking element.

23. The method of claim 22, further comprising:
estimating a load on the escalator or moving walkway by measuring a speed of the escalator or moving walkway with the control device; and
outputting from the control device an initial brake coil current corresponding to a brake torque required to stop the escalator or moving walkway having the estimated load at a stored programmable deceleration rate.

24. The method of claim 22, further comprising:
estimating a temperature of the brake coil with the control device before outputting the initial brake coil current to compensate for resistance variations in the brake coil.

25. The method of claim 23, further comprising:
measuring a deceleration rate of the escalator or moving walkway with the control device;
comparing the measured deceleration rate to the stored programmable deceleration rate with the control device; and
comparing the brake coil current output to a maximum allowable value with the control device.

26. The method of claim 25, wherein the modulating comprises:
decreasing the brake coil current when the measured deceleration rate of the escalator or moving walkway is less than the stored programmable deceleration rate, whereby the torque applied by the braking element to the drive shaft is increased; and
increasing the brake coil current when the measured deceleration rate of the escalator or moving walkway is greater than the stored programmable deceleration rate, whereby the torque applied by the braking element to the drive shaft is decreased.

27. The method of claim 22, further comprising:
executing with the control device a symmetrical diminishing algorithm configured to prevent the control device from outputting a brake coil current greater than or equal to a stored programmable maximum allowable value or less than or equal to zero.

28. The method of claim 25, wherein the modulating comprises:
increasing the brake coil current output by an amount that is the product of the brake coil current output and a predetermined percentage greater than one hundred percent when the measured deceleration rate is greater than the stored programmable deceleration rate and the brake coil current output is less than or equal to half of the maximum allowable value.

29. The method of claim 25, wherein the modulating comprises:
increasing the brake coil current output by a predetermined percentage of the difference between the maximum allowable value and the brake coil current output when the measured deceleration rate is greater than the stored programmable deceleration rate and the brake coil current output is greater than half of the maximum allowable value.

30. The method of claim 25, wherein the modulating comprises:
decreasing the brake coil current output by a predetermined percentage of the difference between the maximum allowable value and the brake coil current output when the measured deceleration rate is less than the stored programmable deceleration rate and the brake coil current output is greater than half of the maximum allowable value.

31. The method of claim 25, wherein the modulating comprises:
decreasing the brake coil current output by an amount that is the product of the brake coil current output and a predetermined percentage less than one hundred percent when the measured deceleration rate is less than the stored programmable deceleration rate and the brake coil current output is less than or equal to half of the maximum allowable value.

32. The method of claim 22, further comprising:
temporarily inserting a resistance in a freewheeling diode flyback circuit of the control device.

33. The method of claim 22, further comprising:
modulating the brake coil current during the run mode of the escalator or moving walkway with the control device to compensate for temperature changes in the brake coil.

34. The method of claim 33, further comprising:
reducing the brake coil current to a predetermined optimum value during the run mode of the escalator or moving walkway with the control device.

* * * * *